(12) United States Patent
Blom

(10) Patent No.: US 12,137,697 B2
(45) Date of Patent: Nov. 12, 2024

(54) DESKINNING APPARATUS FOR A POULTRY LEG

(71) Applicant: Meyn Food Processing Technology B.V., Oostzaan (NL)

(72) Inventor: Dennis Blom, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 62 days.

(21) Appl. No.: 18/078,604

(22) Filed: Dec. 9, 2022

(65) Prior Publication Data

US 2023/0217936 A1    Jul. 13, 2023

(30) Foreign Application Priority Data

Dec. 10, 2021 (NL) ..................................... 2030106

(51) Int. Cl.
*A22C 21/00* (2006.01)
(52) U.S. Cl.
CPC ...... *A22C 21/0092* (2013.01); *A22C 21/0007* (2013.01); *A22C 21/0053* (2013.01)
(58) Field of Classification Search
CPC ............ A22C 21/0092; A22C 21/0007; A22C 21/0053
USPC ........................................................ 452/130
See application file for complete search history.

(56) References Cited

U.S. PATENT DOCUMENTS

| | | | | |
|---|---|---|---|---|
| 3,835,502 | A * | 9/1974 | Thompson ............. | A22B 5/161 452/128 |
| 4,021,883 | A * | 5/1977 | Schmidt, Jr. ........... | A22B 5/161 452/128 |
| 4,035,868 | A * | 7/1977 | Gardner ................. | A22B 5/161 452/128 |
| 5,167,569 | A * | 12/1992 | Davis ..................... | A22B 5/161 452/187 |
| 7,059,954 | B2 * | 6/2006 | Annema ............. | A22C 21/0092 452/136 |
| 7,070,493 | B2 * | 7/2006 | Hazenbroek ....... | A22C 21/0092 452/130 |
| 7,662,031 | B1 * | 2/2010 | Gasbarro ........... | A22C 21/0061 452/130 |

(Continued)

FOREIGN PATENT DOCUMENTS

EP       3811781 A1    4/2021
WO   WO2021/091399 A1    5/2021

OTHER PUBLICATIONS

Search Report for NL Patent Application No. 2030106 dated Nov. 14, 2022 (3 pages).

*Primary Examiner* — Richard T Price, Jr.
(74) *Attorney, Agent, or Firm* — Dority & Manning, P.A.

(57) ABSTRACT

A deskinning apparatus including a conveyor with shackles from which a poultry leg or part of a poultry leg is suspendable by the ankles. Rollers may be positioned below the conveyor to define a nip between the rollers, which may be movable to engage, grip and draw skin on the poultry leg or part of the poultry leg into the nip. The rollers may be arranged to stop rolling after gripping the skin to hold the skin in the nip and may be equipped to subsequently move away from the poultry leg so as to pull the skin loose from the poultry leg The rollers can be configured to enable rotation in one direction only so that after the rollers have stopped rolling to hold the skin in the nip between the rollers, the rollers are blocked from rotating in a counter direction.

10 Claims, 2 Drawing Sheets

(56) References Cited

U.S. PATENT DOCUMENTS

| | | | |
|---|---|---|---|
| 8,037,762 B2* | 10/2011 | La Rosa Flores | ... G01N 29/265 |
| | | | 73/606 |
| 9,167,823 B2* | 10/2015 | Stooker | ............. A22C 21/0092 |
| 10,548,330 B2* | 2/2020 | Van Hillo | ........... A22C 21/0053 |
| 2003/0181157 A1 | 9/2003 | Annema et al. | |
| 2009/0170417 A1* | 7/2009 | Janssen | .............. A22C 21/0053 |
| | | | 452/136 |
| 2019/0142021 A1* | 5/2019 | Van Hillo | .......... A22C 21/0092 |
| | | | 452/128 |

* cited by examiner

DESKINNING APPARATUS FOR A POULTRY LEG

PRIORITY STATEMENT

The present application claims priority under 35 U.S.C. § 119 to Dutch patent application No. 2030106, filed on Dec. 10, 2021.

FIELD OF THE INVENTION

The subject matter of the present disclosure relates to a deskinning apparatus for a poultry leg or part of a poultry leg.

BACKGROUND OF THE INVENTION

EP-A-3 811 781 discloses a deskinning apparatus, wherein the rollers first have to be moved in a horizontal plane to and from a position wherein during use the poultry leg is suspended by the ankles. With this movement the rollers can be brought into engagement with the poultry leg so as to initiate a gripping operation on the skin of the poultry leg.

After gripping the skin and also during the upward movement thereafter, the rollers are arranged to stop rotating. From then on the rollers merely maintain to hold the skin for pulling the skin loose from the poultry leg. The known apparatus includes clamping means for stably positioning the poultry leg during movement of the rollers.

A deskinning apparatus that can achieve higher processing rates would be useful.

BRIEF DESCRIPTION OF THE INVENTION

A further object of the invention is to provide a deskinning apparatus of less complicated design, which is correspondingly less costly to manufacture.

In one exemplary aspect, the present invention can include a conveyor with shackles from which the poultry leg or part of the poultry leg is suspendable by the ankles. Rollers may be provided below the conveyor defining a nip between the rollers that are rotatable with respect to each other in mutually opposite directions. The rollers can be movable to engage, grip and draw the skin on the poultry leg or part of the poultry leg into the nip. The rollers may be arranged to stop rolling after gripping the skin to hold the skin in the nip. In this exemplary aspect, the rollers may be equipped to subsequently move away from the poultry leg so as to pull the skin loose from the poultry leg.

In another exemplary aspect of the invention, the rollers may be configured to enable rotation in one direction only so that after the rollers have stopped rolling to hold the skin in the nip between the rollers. The rollers can be blocked from rotating in a counter direction. This effectively avoids that the skin will be lost during the actual deskinning in which the skin is torn loose from the poultry leg.

In another exemplary aspect of the invention, the rollers may be movable up-and-down for engaging the poultry leg, gripping the skin on the poultry leg, and pulling the skin loose from the poultry leg. This provides a tremendous simplification of the design. In another exemplary aspect of the invention, the rollers may be movable up-and-down for engaging the poultry leg, gripping the skin on the poultry leg, and pulling the skin loose from the poultry leg. This also provides a tremendous simplification of the design.

In one exemplary aspect, the rollers may be oriented horizontally. As used herein, "oriented horizontally" means in a range of ±20° with reference to the horizon or a horizontal plane.

In another exemplary aspect, the knife is arranged to make a circumferential cut in a horizontal plane through the suspended poultry leg.

To improve gripping the skin but also to make driving the rollers less complicated, the rollers may be provided with meshing teeth.

In certain exemplary embodiments, the benefits of the invention can be a particular and at low cost achieved by providing that the apparatus includes at least one freewheel clutch that enables rotation of the rollers in one direction only so that after the rollers have stopped rolling to hold the skin in the nip between the rollers, the rollers are blocked from rotating in a counter direction.

Generally it suffices already that at least one of the rollers may be rotatably connected to the at least one free-wheel clutch. At least one of the rollers may be drivingly connected with a driving device via the at least one freewheel clutch. It is however also possible that the driving device is embodied with a further freewheel clutch.

Suitably the at least one freewheel clutch may be a sprag clutch.

These and other objects of the invention which will become apparent from the following disclosure are provided with a deskinning apparatus having one of more of the features of the appended claims. The invention will hereinafter be further elucidated with reference to the drawing of an exemplary embodiment of a deskinning apparatus according to the invention that is not limiting as to the appended claims.

BRIEF DESCRIPTION OF THE DRAWINGS

In the drawings.

Whenever in the figures the same reference numerals are ap-plied, these numerals refer to the same parts.

DETAILED DESCRIPTION

With reference to FIGS. 1A thru 1F, showing a sequence of operations of the deskinning apparatus 1 of an exemplary embodiment of the invention, it is shown that the deskinning apparatus 1 includes a conveyor 3 with shackles 3' from which the poultry leg or legs 2 are suspendable by the ankles. The exemplary deskinning apparatus 1 includes rollers 4', 4" below the conveyor 3 defining a nip N be-tween each set of rollers 4', 4".

The rollers 4', 4" are rotatable with respect to each other in mutually opposite directions, and the rollers 4', 4" are upwards movable to engage, grip and draw the skin 2' on the poultry leg 2 into the nip N between the rollers 4', 4". This is clearly shown going from FIGS. 1A to 1B to 1C.

Figures 1A, 1B, 1C:
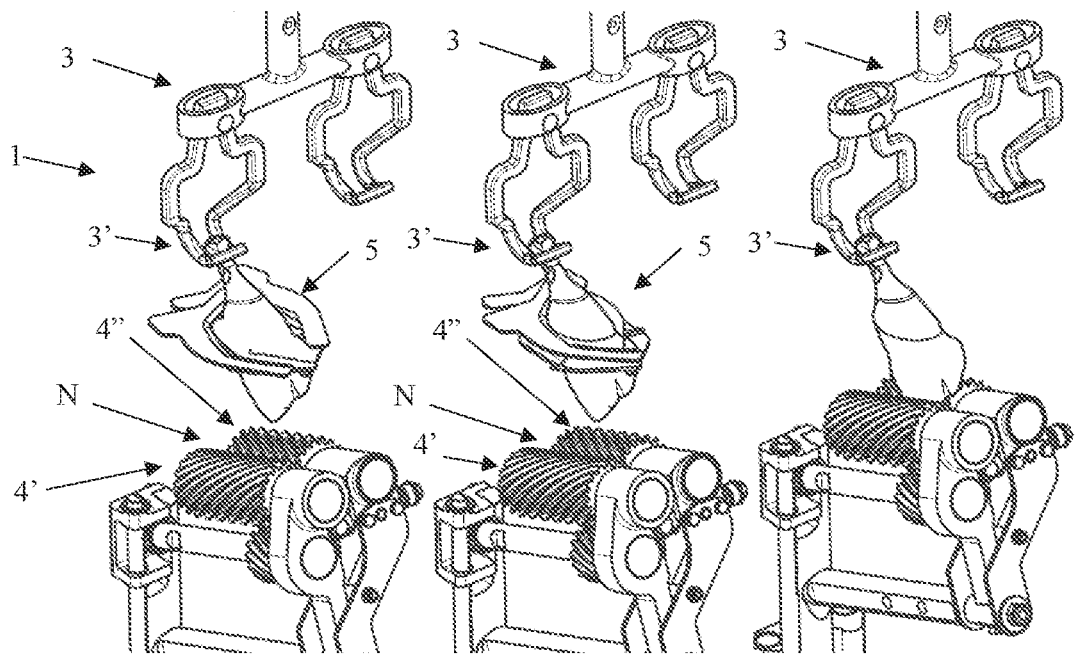
FIGS. 1A to 1F illustrate in one view a series of subsequent operations of a deskinning apparatus of an exemplary embodiment of the invention.

It is also shown that the rollers 4', 4" are oriented horizontally, and in FIGS. 1A and 1*n* FIG. 1B it is shown that the exemplary apparatus 1 includes a knife 5 for making a preparatory cut in the skin 2' of the poultry leg 2. For this exemplary embodiment, this knife 5 is arranged to make a circumferential cut in a horizontal plane through the suspended poultry leg 2.

Although not essential to the invention, the exemplary embodiment of FIGS. 1A thru 1F and FIGS. 2A thru 2C show rollers 4', 4" that are provided with meshing teeth, as will be further detailed hereinafter. It is however also possible to avoid the meshing teeth, and to provide the rollers 4', 4" with merely a rough outer surface to assist in gripping the skin 2' of the poultry leg 2.

Figures 1D, 1E, 1F:
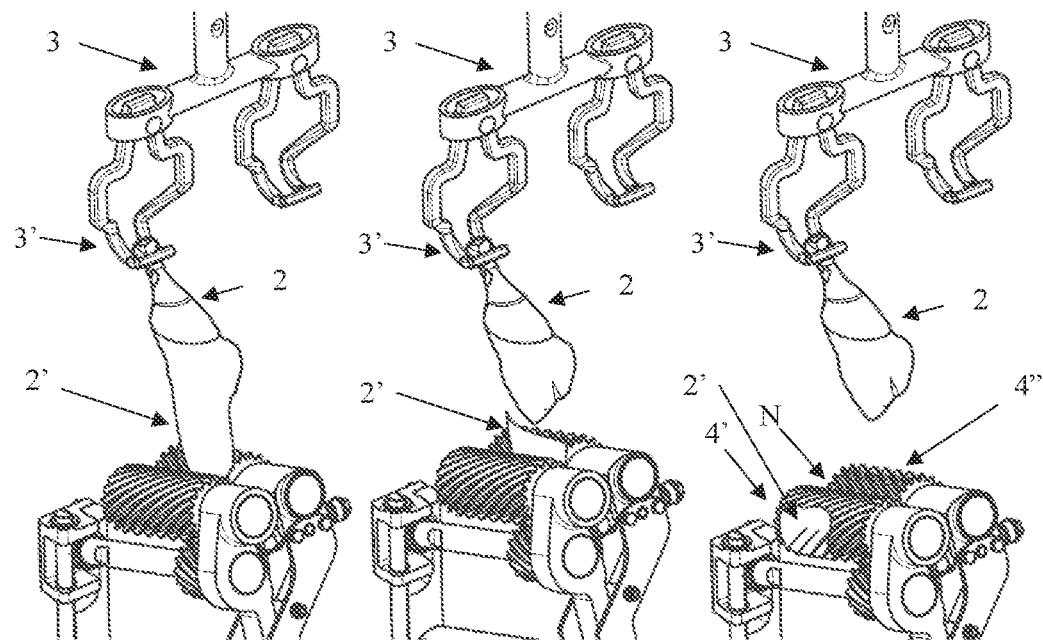

In exemplary embodiments, it is desirable that the rollers 4', 4" are arranged to stop rolling after gripping the skin 2' of the poultry leg 2 and to hold the skin 2' in the nip N between the rollers 4', 4" as depicted in FIG. 1C. FIGS. 1D, 1E, and 1F depict that the rollers 4', 4" are equipped to subsequently move away from the poultry leg 2 so as to pull the skin 2' loose from the poultry leg 2.

All in all FIGS. 1A thru 1F depict that the rollers 4', 4" are movable up-and-down for engaging the poultry leg 2, gripping the skin 2' on the poultry leg 2, and pulling the skin 2' loose from the poultry leg 2.

It is essential to this exemplary embodiment of the invention that the rollers 4', 4" are configured to enable rotation in one direction only so that after the rollers 4', 4" have stopped rolling and from then on merely hold the skin 2' in the nip N between the rollers 4', 4", the rollers 4', 4" are blocked from rotating in a counter direction. In one exemplary aspect, this can be done by arranging that the rollers 4', 4" are driven and blocked individually from rotating in a counter direction.

In another exemplary embodiment, the rollers 4', 4" are linked to each other so as to arrange that the rollers always rotate in opposite directions. In that situation it is possible to connect a driving device to only one of the rollers 4', 4". When in this exemplary embodiment, at least one of the rollers 4' or 4" is rotatably connected to a driving device, this is preferably done via a freewheel mechanism 7 including a freewheel clutch 7', preferably a sprag clutch 7'. This provides that the at least one of the rollers 4' or 4" is enabled to rotate in one direction only and to block rotation in the counter direction, which then also defines the simultaneous rotation and blocking of the other roller of the set of rollers 4', 4".

In another exemplary aspect, the freewheel clutch is a sprag clutch. A sprag clutch is an example of a one-way freewheel clutch. In one exemplary aspect, a sprag clutch resembles a roller bearing but, instead of cylindrical rollers between the races of the bearing, non-revolving asymmetric figure-eight shaped sprags, or other elements allowing single direction rotation, may be used. An exemplary sprag clutch is included in Wikipedia. When the unit rotates in one direction the races of the bearing slip or free-wheel, but when a torque is applied in the opposite direction, the sprags tilt slightly, producing a wedging action and prevent rotation of the races of the bearing because of friction. Freewheel clutches and sprag clutches are provided to the market for example by the firm Renold plc, a company which head office is based in Manchester (UK).

Figure 2A:
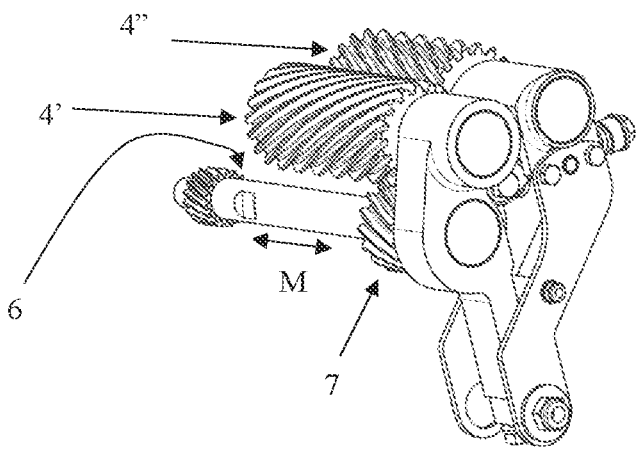
FIGS. 2A, 2B, and 2C illustrate exemplary rollers and driving device of the exemplary deskinning apparatus of the invention in assembled and partly disassembled views.
Figure 2B:
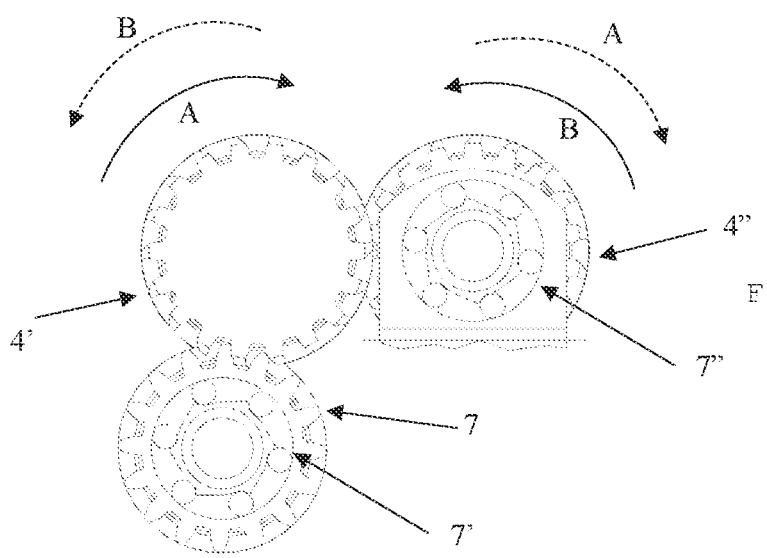
Figure 2C:
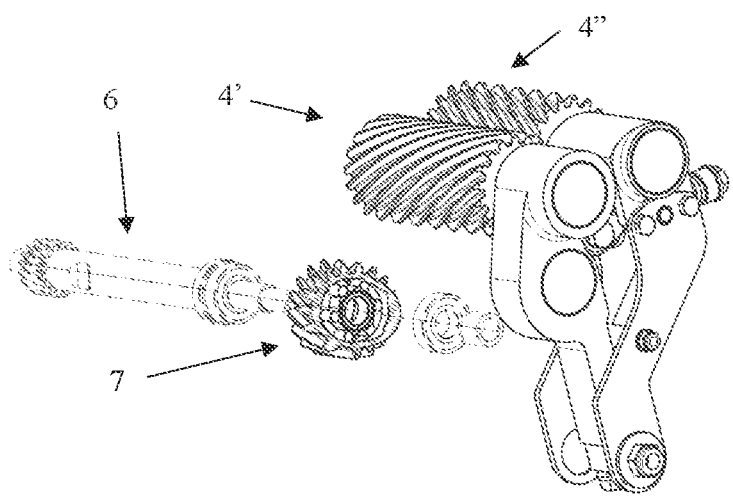

FIGS. 2A thru 2C show an exemplary embodiment of the rollers 4', 4" being part of the deskinning apparatus of FIGS. 1A thru 1F. As shown in FIGS. 2A, 2B and 2C, one roller 4' of the set of rollers 4', 4" is rotatably connected to a driving device 6. The roller 4' can only rotate in a direction A and rotation of this roller 4' in counter direction B (shown as a dashed line) is blocked. This is achieved by providing that the roller 4' includes a freewheel mechanism 7 having a freewheel clutch 7'. Further, as shown in FIG. 2A, and especially in FIG. 2C (exploded view) the driving device 6 can move in direction M to engage the freewheel mechanism 7 so as to drive the roller 4'.

As shown in FIGS. 2A and 2B, the other roller 4" of the set of rollers 4', 4" is arranged such that rotation of the other roller 4" is linked to the rotation of the first roller 4' of the set of rollers 4', 4" by the application of meshing teeth on these rollers 4', 4". Further in the embodiment shown, the other roller 4" can be provided with an optional further freewheel mechanism having a freewheel clutch 7" arranged such that the other roller 4" can rotate in direction B and is blocked in direction A. When the rollers 4', 4" have meshing teeth this arrangement is not necessary, but when the rollers are provided with rough surfaces only so that the rollers 4', 4" can rotate independently from each other, the construction with both rollers 4', 4" being provided with an individual freewheel mechanism as discussed hereinabove is preferable.

Although the invention has been discussed in the foregoing with reference to an exemplary embodiment of the deskinning apparatus of the invention, the invention is not restricted to this particular embodiment which can be varied in many ways without departing from the invention. The dis-cussed exemplary embodiment shall therefore not be used to construe the appended claims strictly in accordance there-with. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. A deskinning apparatus for a poultry leg or part of a poultry leg, comprising:
   a conveyor with shackles from which the poultry leg or part of the poultry leg is suspendable by the ankles;
   rollers below the conveyor defining a nip between the rollers that are rotatable with respect to each other in mutually opposite directions, the rollers are movable to engage, grip and draw the skin on the poultry leg or part of the poultry leg into the nip, wherein the rollers are arranged to stop rolling after gripping the skin to hold the skin in the nip, wherein the rollers are equipped to subsequently move away from the poultry leg so as to pull the skin loose from the poultry leg, wherein the rollers are configured to enable rotation in one direction only so that after the rollers have stopped rolling to hold the skin in the nip between the rollers, the rollers are blocked from rotating in a counter direction.

2. The deskinning apparatus of claim 1, wherein the rollers are movable up-and-down for engaging the poultry leg, gripping the skin on the poultry leg, and pulling the skin loose from the poultry leg.

3. The deskinning apparatus of claim 1, wherein the rollers are oriented horizontally.

4. The deskinning apparatus of any one of claim 1, wherein the apparatus includes a knife for making a preparatory cut in the skin of the poultry leg.

5. The deskinning apparatus of claim 4, wherein the knife is arranged to make a circumferential cut in a horizontal plane through the suspended poultry leg.

6. The deskinning apparatus of claim 1, wherein the apparatus further comprises at least one free-wheel clutch that enables rotation of the rollers in one direction only so that after the rollers have stopped rolling to hold the skin in the nip between the rollers, the rollers are blocked from rotating in a counter direction.

7. The deskinning apparatus of claim 6, wherein at least one of the rollers is rotatably connected to the at least one free-wheel clutch.

8. The deskinning apparatus of claim 6, wherein at least one of the rollers is drivingly connected with a driving device via the at least one free-wheel clutch.

9. The deskinning apparatus of claim 6, wherein the driving device is embodied with a further freewheel clutch.

10. The deskinning apparatus of claim 6, wherein at least one freewheel clutch is a sprag clutch.

\* \* \* \* \*